US009452412B2

(12) United States Patent
Ausner et al.

(10) Patent No.: US 9,452,412 B2
(45) Date of Patent: Sep. 27, 2016

(54) PACKING ELEMENT, METHOD TO PRODUCE IT AND A COLUMN OR REACTOR COMPRISING SAID ELEMENT

(71) Applicant: Sulzer Chemtech AG, Winterthur (CH)

(72) Inventors: Ilja Ausner, Oehningen (DE); Florian Kehrer, Effretikon (CH)

(73) Assignee: Sulzer Chemtech AG, Winterthur (CH)

( * ) Notice: Subject to any disclaimer, the term of this patent is extended or adjusted under 35 U.S.C. 154(b) by 17 days.

(21) Appl. No.: 14/388,364

(22) PCT Filed: Dec. 14, 2012

(86) PCT No.: PCT/EP2012/075477
§ 371 (c)(1),
(2) Date: Sep. 26, 2014

(87) PCT Pub. No.: WO2013/143629
PCT Pub. Date: Oct. 3, 2013

(65) Prior Publication Data
US 2015/0069663 A1 Mar. 12, 2015

(30) Foreign Application Priority Data

Mar. 27, 2012 (EP) .................................... 12161428

(51) Int. Cl.
*B01F 3/04* (2006.01)
*B01J 19/30* (2006.01)
(Continued)

(52) U.S. Cl.
CPC ............ *B01J 19/30* (2013.01); *B01F 3/04468* (2013.01); *B01F 3/04496* (2013.01);
(Continued)

(58) Field of Classification Search
CPC .... B01F 3/04; B01F 3/0446; B01F 3/04468; B01F 3/04496
USPC .................... 261/94, 108, DIG. 72
See application file for complete search history.

(56) References Cited

U.S. PATENT DOCUMENTS 4,554,114 A 11/1985 Glen et al.
5,112,536 A * 5/1992 McNulty .................. B01J 19/30
261/94

(Continued)

FOREIGN PATENT DOCUMENTS

CN 2083071 U 8/1991
CN 201889198 U 7/2011
(Continued)

*Primary Examiner* — Robert A Hopkins
(74) *Attorney, Agent, or Firm* — Larson & Anderson, LLC

(57) ABSTRACT

A packing element (1) for use in mass and/or heat transfer processes through which at least one liquid may flow, wherein the packing element (1): has an outer surface (2) comprising three or more outer arched rib elements (21) and two outer connecting edge elements (22), optionally has an inner surface (3) comprising optional inner arched rib elements (31), wherein the element 1 is substantially spherical or substantially ellipsoidal, and wherein the outer connecting edge elements (22) and the outer arched rib elements (21) and optional inner arched rib elements (31) are embodied such that the total projected area (4) of the packing element (1) when viewed in any direction (7), preferably a radial direction (5) or optional axial direction (6), is partially open due to the presence of an open projected area (41), wherein it is open to an extent that ranges from about 15 to about 50, preferably about 17 to about 40, more preferably about 18 to about 35, most preferably about 20 to about 30% of the total projected area (4). The invention further relates to a method for producing said element (1). The present invention further relates also to a column or reactor comprising a bed of said elements (1), a method to prepare said bed, and the use of the element (1) or column or reactor in a mass transfer and/or heat transfer process and/or in a chemical reaction.

15 Claims, 7 Drawing Sheets

(51) Int. Cl.
    *B29C 45/00* (2006.01)
    *B29L 31/18* (2006.01)

(52) U.S. Cl.
    CPC ....... *B29C 45/00* (2013.01); *B01J 2219/3083* (2013.01); *B01J 2219/30207* (2013.01); *B01J 2219/30211* (2013.01); *B01J 2219/30276* (2013.01); *B01J 2219/30408* (2013.01); *B01J 2219/30416* (2013.01); *B01J 2219/30466* (2013.01); *B01J 2219/30483* (2013.01); *B01J 2219/312* (2013.01); *B01J 2219/318* (2013.01); *B01J 2219/3183* (2013.01); *B29L 2031/18* (2013.01); *Y10T 29/49* (2015.01)

(56) References Cited

U.S. PATENT DOCUMENTS

| | | |
|---|---|---|
| 5,882,772 A | 3/1999 | Schultes |
| 6,387,534 B1 | 5/2002 | Niknafs |
| 2008/0085400 A1 | 4/2008 | Nieuwoudt |
| 2010/0230832 A1 | 9/2010 | Nieuwoudt |

FOREIGN PATENT DOCUMENTS

| | | |
|---|---|---|
| EP | 1541229 A1 | 6/2005 |
| GB | 2 021 970 A | 12/1979 |
| JP | 58219915 | 12/1983 |

\* cited by examiner

PACKING ELEMENT, METHOD TO PRODUCE IT AND A COLUMN OR REACTOR COMPRISING SAID ELEMENT

BACKGROUND OF THE INVENTION

The present invention relates to a packing element. The present invention also relates to a method to produce said element, the use of said element, and a column or reactor containing a packed bed comprising a plurality of said elements, and a method to produce such packed beds.

Packing elements are known and used for mass transfer and/or heat transfer processes in columns and chemical reactors. For example, random or dumped packing elements are normally employed in gas-liquid or liquid-liquid contact towers or columns to provide mass transfer surfaces between a downwardly flowing fluid, typically a liquid stream, and an upwardly ascending fluid, typically gas or vapor stream or another liquid stream. Random packing elements may be used in a variety of chemical and treatment processes, such as, for example, rectification, stripping, fractionating, absorbing, separating, washing, extraction, or any other chemical, heat exchange, or treatment-type processes. Generally, the discrete random packing elements have a specific geometric shape and are designed to maximize performance for a given mass transfer surface area. Because the random packing elements are generally dumped or randomly packed into the column shell in an arbitrarily orientated packed bed, it is desirable for the individual random packing elements to have both high mass transfer efficiency and good hydraulic capacity when positioned in multiple rotational orientations within the packed bed. It is noted that increasing the specific surface area of the elements will generally increase the mass transfer efficiency; however, at the same time this increased area will tend to disadvantageously increase the pressure losses in the column.

The pressure losses accompanying the flow of fluids through columns packed with packing elements are caused by simultaneous kinetic and viscous energy losses. The essential factors determining the energy loss, i.e. pressure drop, in packed beds are: rate of fluid flow, viscosity and density of the fluid; closeness and orientation of the packing elements; and size shape and surface of the packing elements. The first two variables concern the fluid phases, while the last two the solid packing elements. Increasing the pressure loss in the column beyond a particular limit will result in the phenomenon of flooding, in which liquid accumulate becomes entrained in the vapor at the top of the column. Flooding is detected by sharp increases in column differential pressure, liquid hold-up, and significant decrease in separation efficiency. Therefore it is highly desirable to avoid high pressure losses and their associated flooding in packed columns.

Depending on their rotational orientation, the packing elements have a projected area that is of variable openness for the flow of any liquid and gas phases. A very open projected area in terms of the projection on a plane perpendicular to the direction of flow (i.e. up or down) allows the gas phase to flow upwards with little resistance, which contributes then to a reduced pressure drop along the length of the column. However, a very closed projected area in the direction of flow forces the gas phase to take a longer upwards flow path, which contributes then to an increased pressure drop. So the relative openness of the projected areas of the packing elements and their relative orientation to the directions of flow (e.g. upwards and downwards in a vertical column) will determine whether the pressure drop along a packed bed is too high and the column will be flooded and its efficiency reduced.

Random packing elements of the prior art exist in a variety of shapes and materials. In general, random packing elements are constructed of metal, ceramic-type material, plastics, glass, or the like. Commonly, random packing elements are cylindrical, arcuate or "saddle-shaped" or have other, non-arcuate shapes such as toroidal, and the like. One disadvantage of the random packing elements of the prior art is that often the performance of the specific element is highly dependent on its configuration and its orientation with respect to the direction of flow of fluid streams through the element within the packed bed. For example, a Pall ring is a well-known cylinder-type packing that has a plurality of slotted walls and internal tongues or projections. When viewed along its longitudinal axis, the Pall ring presents very little surface area for mass transfer, but, when viewed perpendicularly to its longitudinal axis, the element presents a very large surface area. Because of this difference, the surface areas available for vapor/liquid or liquid/liquid contact vary with the orientation of the element, which, ultimately, affects the element's performance. In addition, the large surface area in the direction perpendicular to the longitudinal axis of the Pall ring is disadvantageous in that it tends to "shield" or inhibit fluid flow through immediately adjacent rings in the downstream flow direction.

Recently developed random packings include those disclosed in U.S. Pat. No. 5,882,772 to Raschig AG or disclosed in US 2010/0230832 A1 to Koch-Glitsch. The random packing element disclosed in US '772 has specific periodic strips that are used to form a certain surface area. These packing elements are quite irregularly shaped. Thus they do not flow easily into a column or reactor when pouring or dumping a packed bed, and they readily assume a variety of orientations in the bed with varying flow properties. For example, the strips are bent only in the x-y plane which allows a highly open projected area (approximately 90% open) to be achieved when viewed in the direction of arrow II, as in FIG. 2 of US '772. The % open area of a projection of a packing element when viewed in any direction is defined as the open area of the viewed projection divided by the total area of the projection multiplied by 100%. On skilled in the art will understand that by "any direction" that it is meant that the packing element is viewed such that the entire element can be seen. For example, the element may be viewed typically in an axial or radial direction. Likewise one skilled in the art will understand that the total area then refers to the entire area of the envelope of projection of the element on the plane perpendicular to the direction of viewing. However, when viewed in the perspective view of FIG. 1 of US '772 the % open area of this embodiment is only 42%. Furthermore, when viewed in the direction of arrow III, as in FIG. 3 of US '772, it can be seen that the projected area of this same packing is nearly completely closed (approximately 0% open). Therefore depending on the orientation of this packing element in the packed bed relative to the direction of the gas flow, either the gas can flow relatively undisturbed through the element (FIG. 2 of US '772) or it must take a relatively long path to flow around the packing element (FIG. 3 of US '772). As a result, the use of these packing elements results in irregular pressure drop fields in the packed bed and a poor distribution of the phases.

US '832 A1 discloses saddle-shaped random packing elements having somewhat more spherical shapes and attempts to make the open flow volume more uniform when the element is positioned in multiple rotational orientations. This is achieved by arranging strips along a partial torus to give a fairly open projected area in these orientations. However the partial torus is not symmetrical around all possible radial axes, and some orientations have quite open projected areas and others are quite closed. For example, an analysis of the % open area of the packing element embodiment in FIGS. 14-26 of US '832 A1 indicates that it varies from a minimum of about 9% open in FIG. 16 to about 50% in FIG. 20. As a result, the use of these packing elements still results in irregular pressure drop fields in the packed bed and a poor distribution of the phases. Furthermore some of the outer rib elements may shield inner rib elements in these packing elements. This shielding effect can reduce mass transfer efficiency by reducing the element's effective surface area for mass and/or heat transfer.

Furthermore the partial torus form of US '832 A1 does not readily flow into a column or reactor during pouring of a bed, and the irregularly shaped torus may then readily assume a variety of non-equivalent orientations in the bed (e.g. with the longitudinal or radial axis oriented in the vertical direction), thus giving rise to irregular pressure drop fields and a poor distribution of phases in the bed.

In conclusion, it would be desirable to have a packing element that is relatively easy to rapidly pack in a random manner into a packed bed by pouring or dumping and that leads to more uniform and only relatively low local pressure losses and more uniform liquid distribution and therefore avoiding premature local flooding when thus randomly packed in the packed bed.

SUMMARY OF THE INVENTION

Starting from this state of the art, it is an object of the invention to provide a packing element that does not suffer from the previous mentioned deficiencies, particularly a tendency to lead to irregular pressure drop fields and related problems of flooding and a poor distribution of phases when randomly packed in a packed bed by pouring or dumping. Further objects of the invention include providing a method to produce said element, as well as a column or reactor comprising a bed of said elements and a method to prepare said bed. An additional further object of the invention is providing a use of said element, column, or reactor in a in a mass transfer and/or heat transfer process and/or in a chemical reaction.

According to the invention, these objects are achieved by a packing element for use in mass and/or heat transfer processes through which at least one liquid may flow, wherein the packing element has an outer surface comprising three or more outer arched rib elements and two outer connecting edge elements, optionally has an inner surface comprising optional inner arched rib elements, wherein the element is substantially spherical or substantially ellipsoidal, and wherein the outer connecting edge elements and the outer arched rib elements and optional inner arched rib elements are provided such that the total projected area of the packing element when viewed in any direction, preferably a radial direction or optional axial direction, is partially open due to the presence of an open projected area, wherein it is partially open to an extent that ranges from about 15 to about 50, preferably about 17 to about 40, more preferably about 18 to about 35, most preferably about 20 to about 30% of the total projected area.

According to the invention, these further objects are achieved firstly by providing a method in which the element is formed from a metal sheet in a forming process by the forming steps consisting of cutting, bending and twisting, optionally perforating or punching, preferably only cutting and bending, and wherein preferably on average less than 20, more preferably less than 10, and most preferably less than 1 weight % of the metal sheet per weight of the packing element is discarded or lost as waste from the forming process. In an alternative embodiment, the object is achieved by providing a method to form the packing element from a thermoplastic material, optionally a thermoplastic material filled with a filler or fibers, in a forming process comprising an injection molding step.

Still a further object is achieved by providing a mass transfer column or a heat transfer column or a chemical reactor containing a packed bed comprising a plurality of said packing elements. Said column or reactor is prepared in accordance with the invention by a method to prepare the packed bed, wherein the process comprises randomly pouring or dumping the packing elements into the column or reactor in order to produce a packed bed comprising a plurality of packing elements in a variety of random orientations.

Said element is used as a random packing element or one of the columns or the reactor is used in accordance with the invention in a mass transfer and/or heat transfer process and/or in a chemical reaction.

The present invention achieves these objects and provides a solution to this problem by means of a shape of the element that is substantially spherical or substantially ellipsoidal, and by means of outer connecting edge elements and outer arched rib elements and optional inner arched rib elements that are embodied such that the total projected area of the packing element when viewed in any direction, preferably a radial direction or axial direction, is partially open due to the presence of an open projected area, wherein it is partially open to an extent that ranges from about 15 to about 50, preferably about 17 to about 40, more preferably about 18 to about 35, most preferably about 20 to about 30%. As a result, the pressure drop fields or the velocity distribution in a packed bed containing these elements will be relatively homogenous, a strong velocity variation will be avoided, a good distribution of the phases will result and local flooding will be minimized. Such elements have relatively homogenous moderate openness in all orientations and thus relatively low and homogenous pressure drop fields in all orientations. Furthermore the substantially spherical or substantially ellipsoidal shape of the packing element contributes to a relatively homogeneous openness of the packing in all of its possible orientations in a bed because of the high rotational symmetry of such shapes. In addition, such relatively rotationally-symmetrical shapes allows the element to be relatively easily and rapidly packed in a random manner into a packed bed by pouring or dumping, and the same shape properties contribute to the elements randomly achieving all possible orientations in the bed, for example, by rolling or rotating during the bed preparation. This high randomness of the relative orientation of the elements and their relatively homogeneous openness and flow and pressure drop properties in all of these various orientations contribute then to more uniform and low local pressure losses and uniform liquid distribution in the bed.

For the substantially spherical or substantially ellipsoidal shaped elements of the invention, the outer connecting edge elements and the outer arched rib elements and the optional inner arched rib elements may be readily embodied to provide the desired percentage of open projected area in any radial or axial direction. One skilled in the art will understand that decreasing the width of the outer connecting edge elements or the rib elements and/or the number of outer connecting edge elements or rib elements of the projected area will increase the percentage of open area for that projection. Increasing the homogeneity of the percentage of open area for all directions may be achieved by increasing the uniformity of the distribution of the outer arched rib elements over the outer surface and the uniformity of the distribution of the optional inner arched rib elements over the optional inner surface together with increasing the uniformity of the width of the outer arched rib elements and of the width of the optional inner arched rib elements.

One skilled in the art will understand that other embodiments of the invention are also possible. For example, a packing element with projected areas having similar degrees of openness may be obtained by providing some projected areas with relatively more but narrower rib elements while other projected areas are provided with relatively fewer but wider rib elements.

These results are then surprisingly achieved without the need for any special complex shapes and structures of the packing element and its outer connecting edge and rib elements. It has furthermore surprisingly been found that the packing element of the present invention has a configuration that resists deformation even when it is constructed using relatively thin gauge material.

In a preferred embodiment of the packing element, the difference between the maximum and minimum percent of open projected area when viewed in any different directions is less than about 20, preferably less than about 15, more preferably less than about 10%. Minimizing this difference has the advantage of ensuring a high homogeneity of the local pressure drop fields around the elements in the bed, less restricted flow paths, and a good distribution of the phases in the bed when the element is randomly packed.

In another preferred embodiment of the element, the packing element is capable of partially rotating, preferably rolling, on an inclined plane in at least one orientation. In a particularly preferred embodiment, the packing element is capable of rolling on an inclined plane it at least two or more, preferably three or more orientations. These embodiments in which the packing element may readily rotate or roll have the advantage that the element may be easily packed into a column or reactor by simply pouring or dumping the packing elements to produce a packed bed and that the elements will also readily assume a variety of random orientations in the bed during packing.

According to another preferred embodiment, the packing element comprises at least one inner arched rib element and wherein the inner arched rib element is fully inner arched, or partially inner arched in one or more continuous inner arched segments, and wherein the inner arched rib element is optionally partially or fully discontinuous to provide an inner arched rib element segment. The advantage of the inner arched rib elements and segments is to reduce the flow length between two gas-liquid contact points as a gas flows through a packing bed and to provide a more homogeneous surface area distribution over the volume of the packing element. At these contact points the gas can transfer energy and mass to the liquid. Considering the flow of a gas through a single packing element with only outer arched rib elements, the gas must flow a relatively long path through the packing element until it contacts fresh liquid at the opposite side of the outer surface. Therefore providing the packing element with inner arched rib elements and segments allows the gas flow to contact a liquid flow earlier over a short path.

Therefore the number of contact points between gas and liquid along the flow axis in the packed bed is increased by using inner arched rib elements and segments. Additionally these segments may be advantageously directed towards the interior of the packing element so as to minimize protruding elements from the outer surface of the packing element. Such protrusions may interfere with the capability of the packing element to readily rotate or roll, or they may result in entanglements of packing elements thus reducing their ability to flow during pouring or dumping or resulting in projected areas in the bed of reduced openness or flow.

According to another preferred embodiment, the packing element is substantially ellipsoidal in shape and substantially longer in an axial direction than in a radial direction such that the ratio of the axial length to the maximum radial length is from about 1.1 to about 3, preferably from about 1.2 to about 2.5, more preferably from about 1.5 to about 2.2, most preferably from about 1.7 to about 2.0. Ellipsoidal shaped packing elements may be readily manufactured from tubes of sheet metal, as discussed in detail later. Furthermore ellipsoidal shapes are capable of partially rotating or even rolling on an inclined plane in several orientations. In addition, less symmetric elongated shapes will not tend to fall and land randomly during packing, analogous to a pencil falling on a table. Therefore maintaining these ranges of ratios and restricting the elongation of the substantially ellipsoidal shape ensures that the packing elements may readily assume a variety of random orientations in the packed bed and assists in achieving a high homogeneity of the local pressure drop fields around the elements in the bed.

In still yet another preferred embodiment of the packing element, at least one of the outer arched rib elements is partially or fully discontinuous to provide an outer arched rib element segment. As discussed above, the creation of such partially or fully discontinuous segments provides additional contact points between gas and liquid along the flow axis in the packed bed containing the packing element. Likewise these segments may be advantageously directed towards the interior of the packing element so as to minimize protruding elements from the outer surface of the packing element and their previously stated disadvantages.

In yet another preferred embodiment of the packing element, the total number of outer arched rib elements and any inner arched rib elements is from 3 to 20, preferably 4 to 15, more preferably 4 to 10, most preferably 5 to 8. Such total numbers of rib elements provide an optimum strength and mechanical integrity of the packing element, along with a desirable high surface area, and without being too complex to be easily and inexpensively manufactured or to provide too little open projected area for achieving a low pressure drop and good distribution of the phases.

In yet a further preferred embodiment of the packing element, the packing element is made of metal, preferably stainless steel or aluminium sheet metal, more preferably of sheet metal made of thickness 3.0 to 0.08 mm, preferably 1.0 to 0.2 mm, or of ceramic, or of a plastic material, preferably a thermoplastic material, optionally a thermoplastic material filled with a filler or fibers. Such materials of construction allow a ready manufacture of the packing element of the invention while providing it with the necessary mechanical integrity and strength. In addition, these listed materials have a wide variety of properties thus allowing the packing element to be manufactured having specific thermal, chemical and/or corrosion resistance properties depending on the specific application.

In a method of the invention, the packing element is formed from a metal sheet in a forming process by the forming steps consisting of cutting, bending and twisting, optionally perforating or punching, preferably only cutting and bending, and wherein preferably on average less than 20, more preferably less than 10, and most preferably less than 1 weight % of the metal sheet per weight of the packing element is discarded or lost as waste from the forming process. In one preferred embodiment, the cuts to make the rib elements will be made non-parallel to the axis of the produced element in order to minimize entanglements of the elements. Manufacturing the packing element in this way provides a simple and economic production process.

In a further preferred embodiment of this method, the packing element is either: (i) substantially spherical and wherein the packing element is produced from a flat metal sheet having two outer connecting edge elements in the form of parallel opposing rectangular flaps and rib elements in the form of curved strips between the edge elements in a process comprising a step in which some rib elements are bent up and other rib elements are bent down from the edge elements and the plane of the metal sheet in order to produce outer arched rib elements and an outer surface with a substantially spherical shape, and a subsequent step in which two directly opposing corners of the edge elements are drawn towards each other; or (ii) substantially ellipsoidal and wherein the packing element is produced from a sheet metal tube having two outer connecting edge elements in the form of solid tube edge elements with rib elements in the form of connecting strips comprised by the interior tube portion between the edge elements in a process in which the rib elements are bent outwards from the original tubular shape to produce outer arched rib elements and an outer surface with a substantially ellipsoidal shape, and whereby the outer arched rib elements are preferably twisted or cut to misalign them from the axial axis of the ellipsoidal packing element. In one embodiment, the production of the substantially ellipsoidal packing element starts a flat metal sheet which is cut to provide the solid tube edge elements and connecting strips and then rolled into a tubular form. In one specific further embodiment, there is a gap between both end edges of the rolled sheet, and in another specific further embodiment there is no gap because the end edges are welded closed after rolling to give a solid continuous sheet tube. In another embodiment, the production of the substantially ellipsoidal packing element starts with a solid sheet tube (e.g. as produced by extrusion) into which the solid tube edge elements and connecting strips are cut.

In an alternative preferred embodiment of the method to produce the packing element, the packing element is made of a thermoplastic material, optionally a thermoplastic material filled with a filler or fibers, in a forming process comprising an injection molding step. Manufacturing the packing element in this way provides a simple and economic production process.

Further aspects of the present invention include a mass transfer column or a heat transfer column or a chemical reactor containing a packed bed comprising a plurality of packing elements according to the invention. Such columns and reactors benefit from the previously discussed advantages of the packing element of the invention.

A related further aspect of the present invention is a method to prepare the packed bed of said mass transfer column or said heat transfer column or said chemical reactor, wherein the process comprises randomly pouring or dumping the packing elements of the invention into the column or reactor in order to produce a packed bed comprising a plurality of packing elements in a variety of random orientations. Such methods benefit from the previously discussed advantages of the packing element of the invention, particularly its relatively homogenous moderate openness in all orientations and its high rotational symmetry, as well as its ability to partially rotate and/or roll in some preferred embodiments.

A final further aspect of the present invention is the use of the packing element of the invention as a random packing element or one of the columns or the reactor containing a packed bed comprising a plurality of packing elements according to the invention in a mass transfer and/or heat transfer process and/or in a chemical reaction. Such use benefits then from the previously discussed advantages of the packing element of the invention.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one packing element claim may be combined with the subject matter of one or more method, column, reactor or use claims or the subject matter of one or more other packing element claims or the subject matter of a mixture of one or more packing element, method, column, reactor or use claims. By analogy, the subject matter of any one method claim may be combined with the subject matter of one or more other method claims or the subject matter of one or more packing element, column, reactor or use claims or the subject matter of a mixture of one or more method claims and packing element, column, reactor or use claims. By way of example, the subject matter of claim 1 may be combined with the subject matter of any one of claims 10 to 15. In one embodiment, the subject matter of claim 10, 13, 14, or 15 is combined with the subject matter of any one of claims 1 to 9. In one specific embodiment, the subject matter of claim 10 is combined with the subject matter of claim 2. In another specific embodiment, the subject matter of claim 3 is combined with the subject matter of claim 11. By way of another example, the subject matter of claim 1 may also be combined with the subject matter of any two of claims 2 to 15. In one specific embodiment, the subject matter of claim 1 is combined with the subject matter of claims 2 and 3. In another specific embodiment, the subject matter of claim 11 is combined with the subject matters of claims 1 and 2. By way of example, the subject matter of claim 1 may be combined with the subject matter of any three of claims 2 to 15. In one specific embodiment, the subject matter of claim 1 is combined with the subject matters of claims 2, 3 and 10. In another specific embodiment, the subject matter of claim 10 is combined with the subject matters of claims 1, 3, and 11. In yet another specific embodiment, the subject matter of claim 1 is combined with the subject matters of claims 2 to 9 and 11. In yet another specific embodiment, the subject matter of claim 13 is combined with the subject matters of claims 1 and 9 to 11. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned preferred embodiments may be combined with the subject matter of one or more of the other above-mentioned preferred embodiments without limitation. By way of example, according to a particularly preferred embodiment of the packing element, the packing element is substantially is capable of rolling on an inclined plane in at least one orientation and the total number of outer arched rib elements and any inner arched rib elements is from 5 to 8. By way of another example, according to another particularly preferred embodiment of the method to produce the packing element, the packing element of the invention is substantially spherical and it is produced from a flat metal sheet of thickness 1.0 to 0.2 mm having two outer connecting edge elements in the form of parallel opposing rectangular flaps and rib elements in the form of curved strips between the edge elements in a process comprising a step in which some rib elements are bent up and other rib elements are bent down from the edge elements and the plane of the metal sheet in order to produce outer arched rib elements and an outer surface, and a subsequent step in which two directly opposing corners of the edge elements are drawn towards each other; and less than 1 weight % of the metal sheet per weight of the packing element is discarded or lost as waste in the process; the resulting packing element is capable of rolling on an inclined plane in at least two or more orientations; and the packing element has a total number of outer and any inner arched elements of from 5 to 8. By way of example, the subject matter of any one embodiment may be combined with the subject matters of any number of the other embodiments without limitation to the extent that such combinations are technically feasible.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

Figure 1:
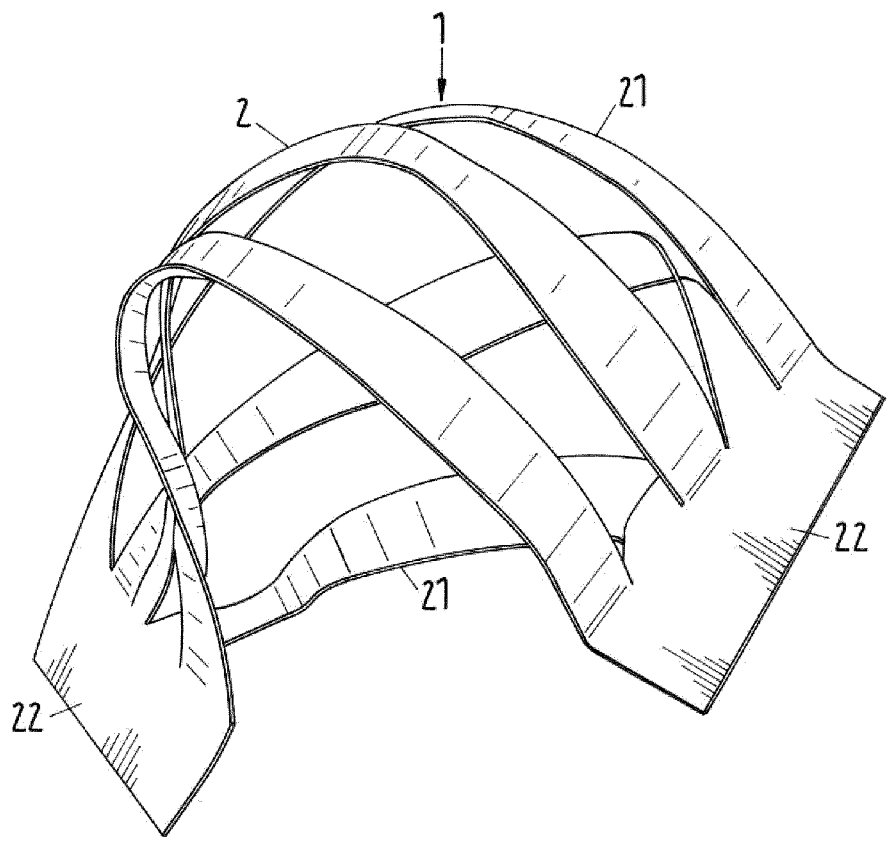
FIG. 1 shows a schematic view of an embodiment of a substantially spherical packing element according to the invention.

FIG. 1 shows a schematic view of an embodiment of a packing element according to the invention, which as a whole is labeled with reference number 1. The packing element 1 is not specifically limited as to form, shape, construction or composition unless specifically indicated otherwise, as in the case of the indication of a substantially spherical or substantially ellipsoidal element 1. Any material that can be fabricated can be made into a packing element 1. For reasons of economy and mechanical strength and integrity, packing elements 1 are often made from made of metal, preferably stainless steel or aluminium sheet metal, more preferably of sheet metal made of thickness 3.0 to 0.08 mm, preferably 1.0 to 0.2 mm, or of ceramic, or of a plastic material, preferably a thermoplastic material, optionally a thermoplastic material filled with a filler or fibers, or any other material indicated for the specific application. In one embodiment, the packing element 1 is be made from polypropylene or other plastics for low initial cost, or any other materials including metals depending upon the process requirements. Suitable metals include carbon steel, stainless steel, nickel alloys, copper alloys, titanium and zirconium. Suitable engineering plastics include fluoropolymers such as PTFE, PVDF, or ETFE; PVC; and polypropylenes. In certain preferred embodiments, the packing element 1 will have smooth (non-grooved) surfaces.

When the packing element 1 is made from metal sheet, in a method of the invention in which the packing element is formed from a metal sheet in a forming process by the forming steps consisting of cutting, bending and twisting, optionally perforating or punching, preferably only cutting and bending, and wherein preferably on average less than 20, more preferably less than 10, and most preferably less than 1 weight % of the metal sheet per weight of the packing element is discarded or lost as waste from the forming process. When the packing element 1 is made of a thermoplastic material, optionally a thermoplastic material filled with a filler or fibers, it is formed in a method of the invention in a forming process comprising an injection molding step. Such manufacturing methods are characterized by simple and inexpensive methods and inexpensive raw materials, and they are thus economically favorable.

Packing elements and their construction and their use in packed beds of mass transfer and or heat transfer columns and chemical reactors and in mass transfer and/or heat transfer and/or chemical reactions are well known in the art, for example, as disclosed in Chemical Engineering Design, Coulson & Richardson's Chemical Engineering Series, by R. K. Sinnott, John Metcalfe Coulson, and John Francis Richardson, 4$^{th}$ Ed. published in 2005 by Elsevier (ISBN 0 7506 6538 6) or Packed bed columns: for absorption, desorption, rectification and direct heat transfer by N. Kolev, 1$^{st}$ Ed. published in 2006 by Elsevier (ISBN-13: 978-0-444-52829-2). Unless indicated otherwise, conventional construction materials and means, may be used for the packing element 1, and the packing element 1 may be used in a column or reactor in a mass transfer and/or heat transfer and/or reaction process in a conventional manner as known in the art.

The embodiment in FIG. 1 is a substantially spherical packing element 1, but it will be understood by one skilled in the art that other substantially spherical shapes of the packing element 1 are possible so long as technically feasible. The term "substantially spherical" means not deviating significantly from the shape of a sphere and that the outer surface 2 comprising outer arched rib elements 21 and outer connecting edge elements 22 will define a substantially spherical shape. In some embodiments, the element 1 will be subspherical, and in other embodiments it will be spherical.

In the present application, "outer connecting edge element" 22 refers to an outer edge element that fulfills the function of connecting together the outer arched rib elements 21, as well as the optional inner arched rib elements 31, if they are present. Such outer connecting edge elements 22 provide holding, contacting or clamping surfaces for use during the manufacture of the packing element 1. Such surfaces are useful during a variety of forming steps (e.g. mechanical operations) such as cutting, bending, or twisting.

In some embodiments the shape of the packing element will deviate from a perfect sphere in that the arched rib elements 21 may not be perfectly or smoothly curved due to the manufacturing process or they may be intentionally twisted in order to reduce the potential for entanglements between adjacent packing elements 1. In another embodiment, the elements 21 have been produced by cuts made non-parallel to the axis of the produced packing element 1 in order to minimize entanglements. In other embodiments the shape of the packing element 1 will deviate from a perfect sphere in that the outer connecting edge elements 22 are somewhat flattened due to the manufacturing process. In many embodiments the substantially spherical packing element 1 will be capable of at least partially rotating, preferably rolling, on an inclined plane it at least one, preferably two or more, more preferably three or more orientations. One skilled in the art will understand that as the shape of the packing element 1 approaches that of a perfect sphere it will be able to roll better and ultimately then roll in any orientation. Additionally one skilled in the art will understand that a perfectly spherical packing element 1 will have only radial directions and no axial directions.

The substantially spherical packing element 1 of FIG. 1 can be seen to have an outer surface 2 comprising three or more outer arched rib elements 21 and two outer connecting edge elements 22. It can be seen that this embodiment in fact has two outer connecting edge elements 22 and five outer arched rib elements 21. The number of outer connecting edge elements 22 is not specifically limited in the packing element 1 of the invention, however at least two edge elements 22 are required for griping the packing element 1 and its precursors during its manufacture, for example, from metal sheet. It can also be seen that this embodiment in FIG. 1 does not have an optional inner surface 3 comprising optional inner arched rib elements 31. The packing element 1 will preferably be made from material of sufficient thickness and strength to resist deformation of its outer surface 2 and its elements 21 and 22.

Figure 2:
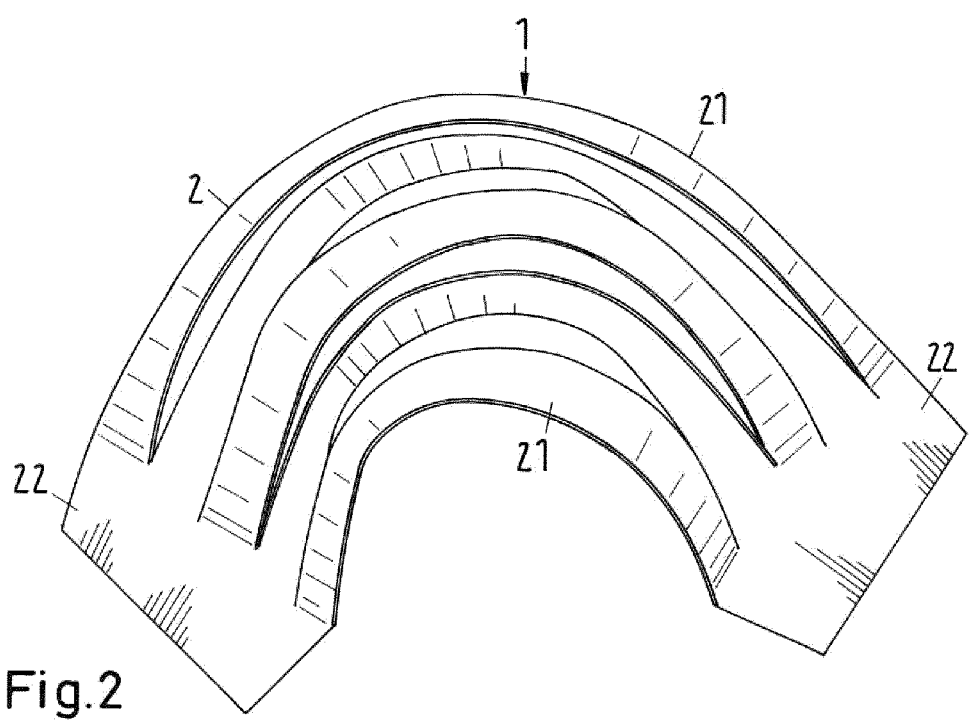
FIG. 2 shows another perspective of the substantially spherical packing element of FIG. 1.
Figure 3:
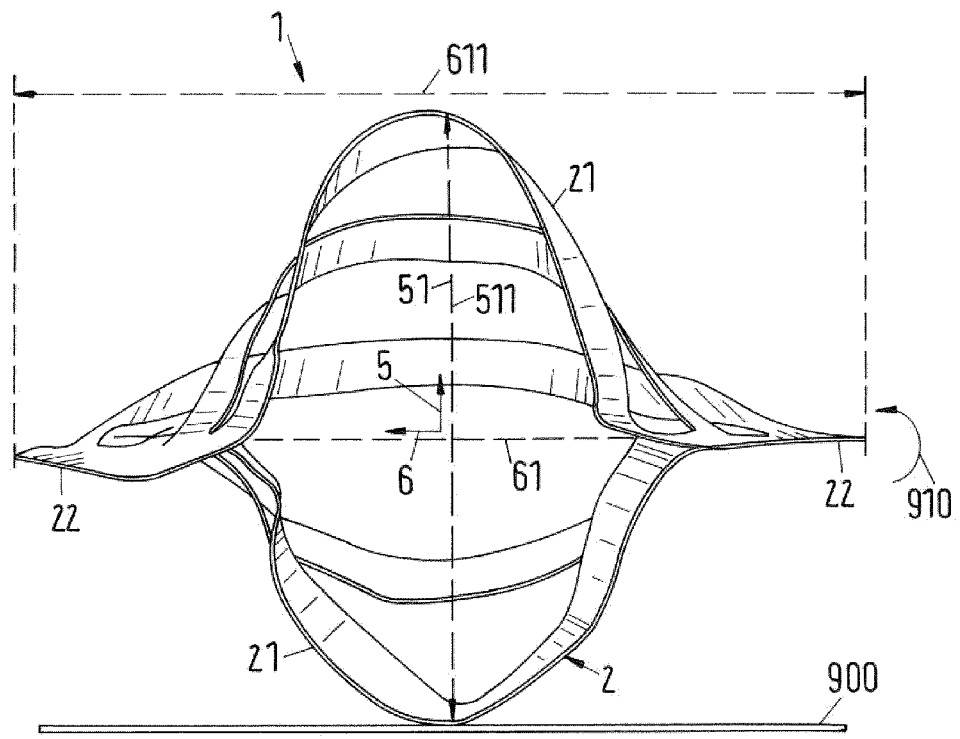
FIG. 3 shows yet another perspective of the substantially spherical packing element of FIG. 1.
Figure 4:
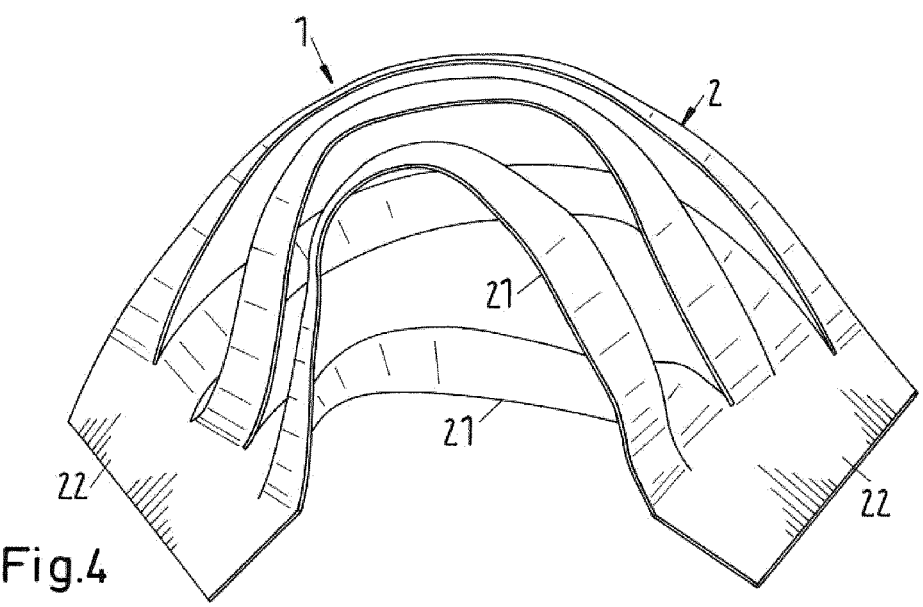
FIG. 4 shows still yet another perspective of the substantially spherical packing element of FIG. 1.
Figure 5:
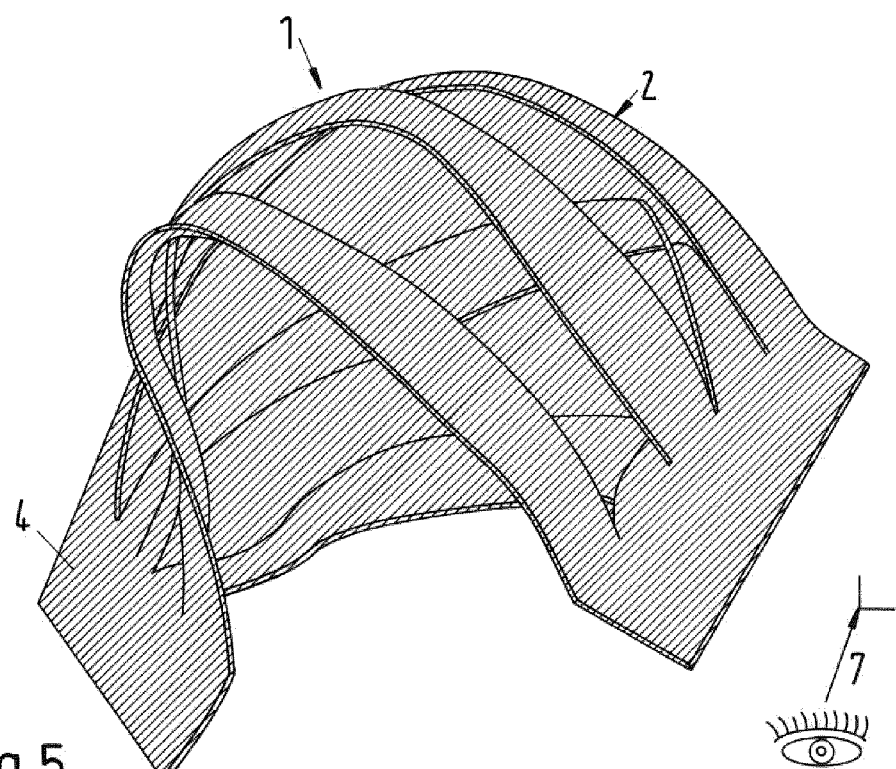
FIG. 5 shows a schematic view of the total projected area of the substantially spherical packing element of FIG. 1.
Figure 6:
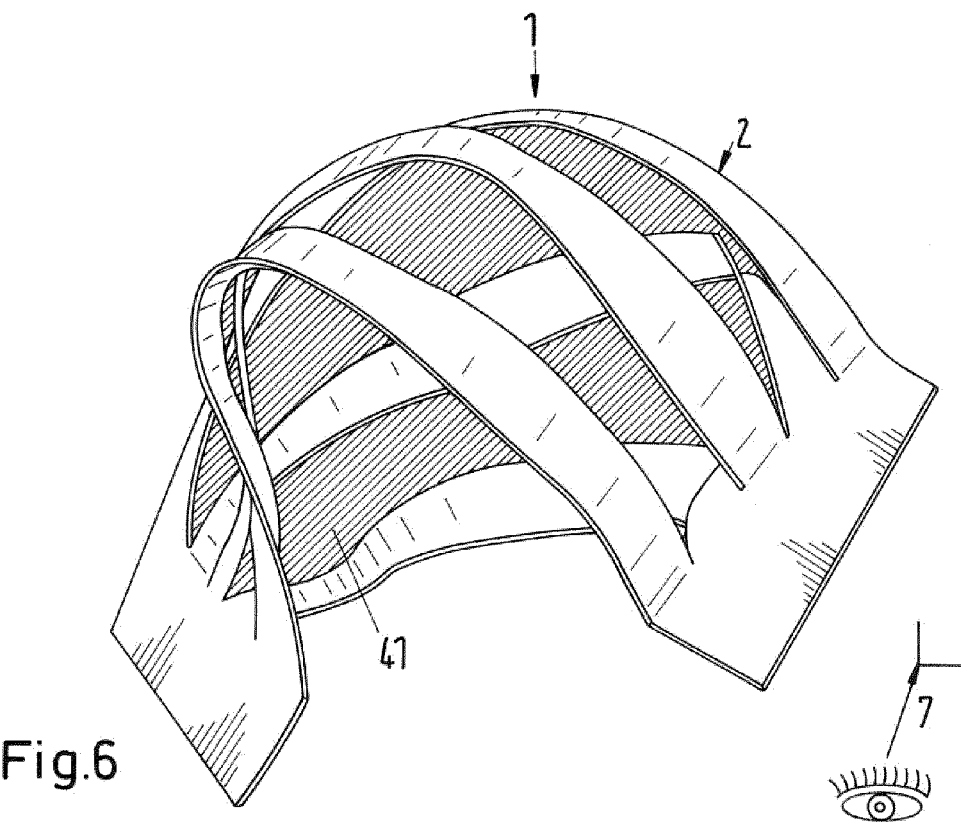
FIG. 6 shows a schematic view of the open projected area of the total projected area of FIG. 5.
Figure 7:
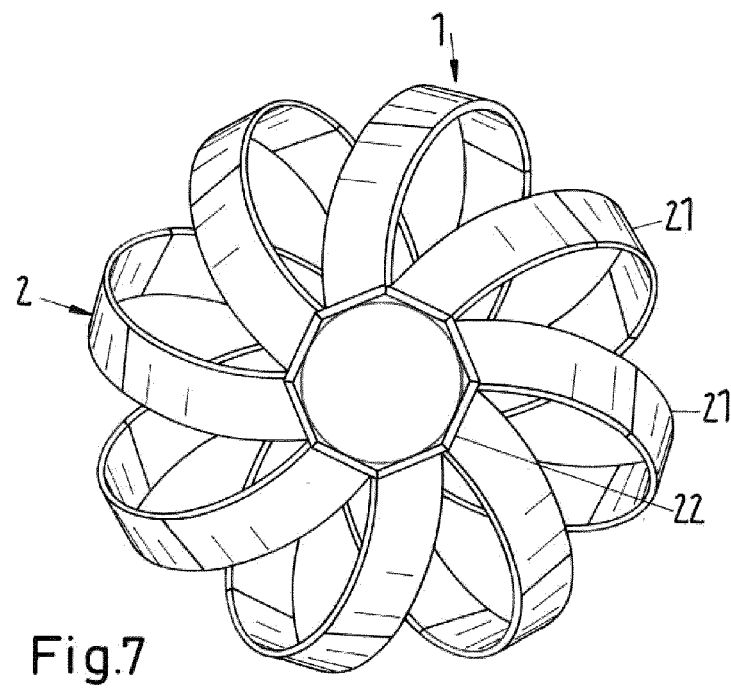
FIG. 7 shows a schematic view of an embodiment of a substantially ellipsoidal packing element according to the invention.
Figure 8:
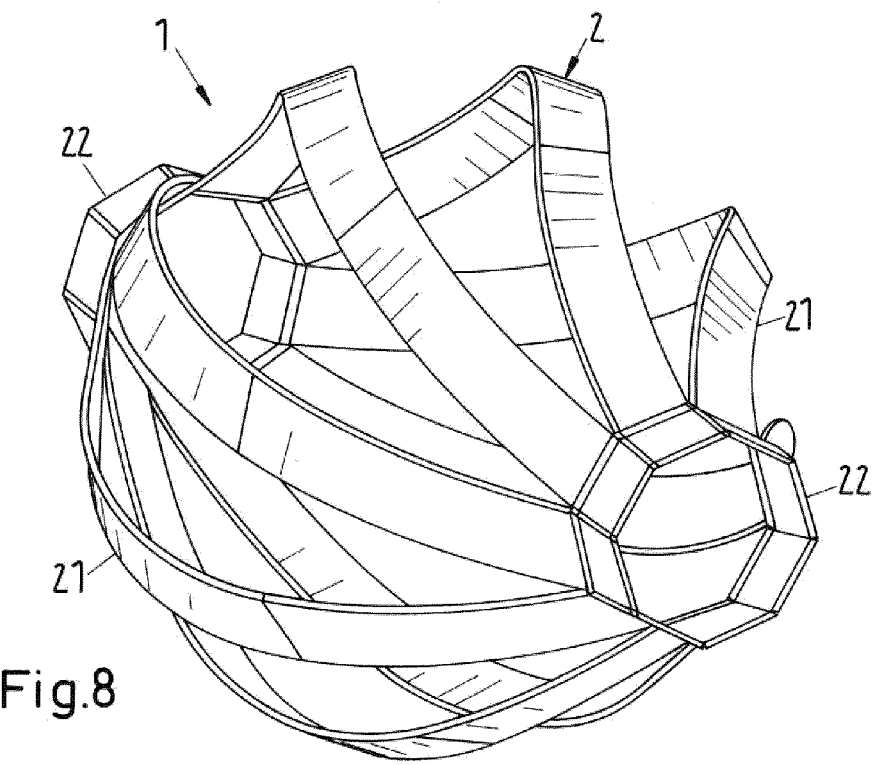
FIG. 8 shows another perspective of the substantially ellipsoidal packing element of FIG. 7.

FIGS. 2-4 show other perspectives of the substantially spherical packing element 1 of FIG. 1. It can be seen that the packing element 1 is not perfectly spherical, and thus it has both radial axes such as 51 and directions such as 5, as well as an axial axis 61 and direction 6. FIG. 5 shows a schematic view of the total projected area 4 of the substantially spherical packing element 1 of FIG. 1. FIG. 6 shows a schematic view of the open area 41 of the total projected area 4 of FIG. 5.

As stated earlier, the % open area of a projection of a packing element when viewed in any particular direction is defined as the open area of the viewed projection divided by the total area of the projection multiplied by 100%. One skilled in the art will understand that by "any direction" that it is meant that the packing element is viewed in a direction such that the entire element can be seen. For example, the element may be viewed typically in an axial or radial direction (6 or 5). Likewise one skilled in the art will understand that the total area then refers to the entire area of the envelope of the projection of the element on the plane perpendicular to the direction of viewing. The % open area determination when the total projected area 4 is viewed in any direction 7 is done as follows. An image of the packing element 1 (viewed so that the entire element and its entire envelope can be seen in the image), e.g. obtained by a camera, is first loaded to an image analysis software, such as the commercially available SigmaScan Pro™ software from SPSS Inc. or the open source software, ImageJ from the National Institute of Health, USA. The pixel area of the outer surface 2 defined by the profile of the outer contour of the outer surface 4 is then measured as a representation of the total projected area 4, as indicated by the hatched area in FIG. 5. Next the pixel area of all interior profiles defined by the inner contours of the outer arched rib elements 21 and outer connecting edge elements 22 which can be looked through in the original image (e.g. FIG. 1) is measured as a representation of the open projected area 41. Finally the measured open projected area 41 is divided by the measured total projected area 4 and multiplied by 100% to obtain the % open projected area. Such measurements of % open projected area may be repeated for several various other viewing directions in order to calculate a range and/or average value and/or a maximum and minimum percent. One skilled in the art will understand that less regularly constructed elements 1 (a rotationally-asymmetrical substantially ellipsoidal element 1) will need to be measured in more directions than a more regularly constructed element 1 (e.g. a rotationally-symmetrical perfectly spherical element 1).

In one preferred embodiment, the element 1 is substantially spherical and it is viewed in a radial direction 5, and in another preferred embodiment the element 1 is substantially ellipsoidal and it is viewed in a radial or axial direction (5 or 6).

In the packing element 1 of the invention, the outer connecting edge elements 22 and the outer arched rib elements 21 and optional inner arched rib elements 31 are embodied such that the total projected area 4 of the packing element 1 when viewed in any direction, preferably a radial direction 5 or optional axial direction 6, is partially open due to the presence of an open projected area 41, wherein it is open to an extent that ranges from about 15 to about 50, preferably about 17 to about 40, more preferably about 18 to about 35, most preferably about 20 to about 30% of the total area 4.

In a preferred embodiment of the packing element 1 of the invention, the difference between the maximum and minimum percent of open projected area 41 in different viewing directions is less than about 20, preferably less than about 15, more preferably less than about 10%.

In the calculations based on FIGS. 5 and 6, the percent open projected area was determined to be approximately 26%, and multiple measurements in different radial or axial viewing directions indicated that the percent open projected area varied between a maximum of about 50% and a minimum of about 15%, and the average was about 29%.

In one embodiment of the packing element 1 of the invention, the difference between the maximum and minimum percent of open projected area 41 in different viewing directions 7 is less than about 20, preferably less than about 15, more preferably less than about 10%. Minimizing this difference helps to ensure a high homogeneity of the local pressure drop fields around the elements and less restricted flow paths in the bed, as well as a good distribution of the phases.

The packing element 1 is adapted for the flow of at least one liquid; however, in many embodiments it will be adapted for the flow of a liquid phase and a vapor or gas phase. In many embodiments, the liquid phase will flow downward and the vapor phase will flow upwards. However in some embodiments both the descending and ascending phases may be liquid or both may be gases. Generally the descending phase will be denser and the ascending phase will be lighter. The liquids, vapors, and gases are not specifically limited and they may, for example, comprise one or more organic compounds, solvents, water or mixtures thereof.

In certain preferred embodiments, the packing element 1 is capable of partially rotating, preferably rolling, on an inclined plane in at least one orientation. For example, the substantially spherical packing element 1 shown in FIGS. 1-4 can be seen to be capable of partially rotating in many orientations. Additionally, it can be seen that this substantially-spherical embodiment is readily capable of rolling in the direction of the arrow 910 on the inclined plane 900 in the orientation shown in FIG. 3. In other preferred embodiments, the packing element 1 is capable of rolling on an inclined plane 900 in at least two or more, preferably three or more orientations. For less spherically-symmetrical elements 1, the rolling may also comprise other motions such as wobbling, spinning, sliding, or hopping as part of the overall movement down an inclined plane 900. The ability to partially rotate or even roll makes the packing element 1 easy to be packed into a column or reactor by pouring or dumping a packed bed, and the elements 1 will also readily assume a variety of random orientations in the bed during packing. Furthermore elements 1 that can partially rotate or even roll will tend to be more rotationally symmetrical which will also then contribute to increasing the homogeneity of the local pressure drop fields around the elements.

Figure 11:
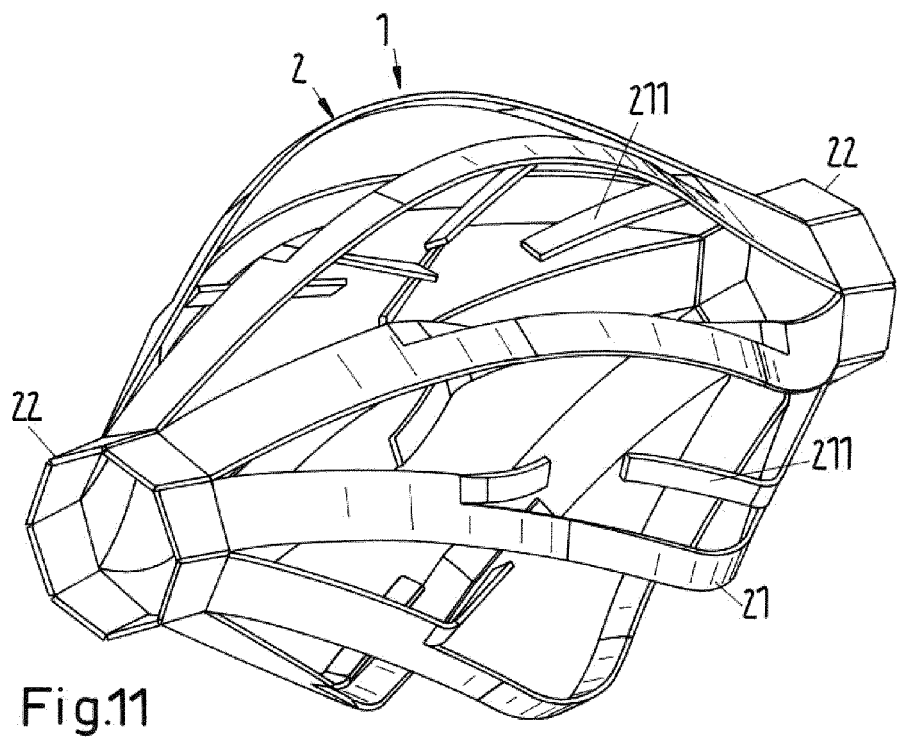
FIG. 11 shows a schematic view of an embodiment of a substantially ellipsoidal packing element according to the invention having outer arched rib elements partially discontinuous to provide outer arched rib element segments.
Figure 12:
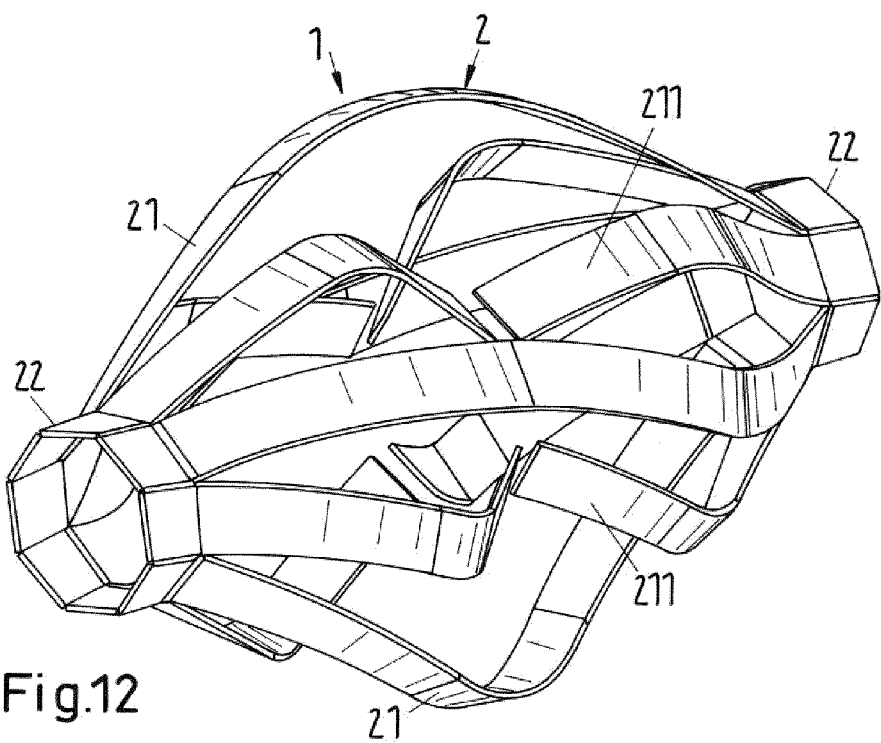
FIG. 12 shows a schematic view of an embodiment of a substantially ellipsoidal packing element according to the invention having outer arched rib elements fully discontinuous to provide outer arched rib element segments.

One skilled in the art will therefore readily understand how to achieve partial rotation or rolling. Elements 1 that are more rotationally symmetrical and have more numerous and/or evenly spaced and smoother outer arched rib elements 21 will have improved rotation and rolling. Outer arch rib element segments 211 that are partially discontinuous as in FIG. 11 or fully discontinuous as in FIG. 12 will tend to inhibit rotation and rolling, particularly if any discontinuities would protrude outwards. Elements 1 that are more perfectly spherical or ellipsoidal will rotate and roll better than those that are less substantially spherical or ellipsoidal. Elements 1 that are substantially spherical will also tend to be able to rotate or roll in a greater variety of orientations than substantially ellipsoidal elements.

The ability of an element 1 to rotate or roll may be readily tested without undue burden by one skilled in the art by simply placing the element 1 on an inclined plane. Elements having improved rotating or rolling will readily rotate or roll when placed on inclined planes having lower angles of inclination. Similarly the element 1 may be placed on the inclined plane in a variety of orientations in order to test the ability of the element 1 to rotate or roll as a function of those orientations.

It can also be seen from FIG. 3 that the packing element 1 is not substantially longer in an axial direction 6 than in a radial direction 5 such that the ratio of the axial length 611 to the maximum radial length 511 is from about 1 to about 1.6, preferably from about 1.1 to about 1.5, more preferably from about 1.2 to about 1.4. In the specific embodiment shown in FIG. 3, the ratio is approximately 1.4. Such low ratios help to ensure that the packing element 1 falls and lands randomly when it is poured or dumped to make a packed bed.

In a preferred method to produce the packing element 1, a substantially spherical element 1, such as that exemplified by FIGS. 1 to 4, is produced from a flat metal sheet having two outer connecting edge elements 22 in the form of parallel opposing rectangular flaps and rib elements in the form of curved strips between the edge elements 22 in a process comprising a step in which some rib elements are bent up and other rib elements are bent down from the edge elements 22 and the plane of the metal sheet in order to produce outer arched rib elements 21 and an outer surface 2, and a subsequent step in which two directly opposing corners of the edge elements 22 are drawn towards each other. Such methods are characterized by low cost materials and manufacturing steps and are thus economically favorable. They may additionally preferably be automated.

The embodiment shown in FIGS. 7-10 is a substantially ellipsoidal packing element 1, but it will be understood by one skilled in the art that other substantially ellipsoidal shapes of the packing element 1 are possible so long as technically feasible. The term "substantially ellipsoidal" means not deviating significantly from the shape of an ellipsoid and that the outer surface 2 comprising outer arched rib elements 21 and outer connecting edge elements 22 will define a substantially ellipsoidal shape. In some embodiments the shape of the packing element will deviate from a perfect ellipsoid in that the arched rib elements 21 may not be perfectly or smoothly curved due to the manufacturing process or they may be intentionally twisted in order to reduce the potential for entanglements between adjacent packing elements 1. In another embodiment, the cuts to make the rib elements will be made non-parallel to the axis of the produced element in order to minimize entanglements of the elements. In other embodiments the shape of the packing element 1 will deviate from a perfect ellipsoid in that the outer connecting edge elements are somewhat flattened due to the manufacturing process. In some embodiments the packing element 1 will be substantially ellipsoidal and in others it will be an ellipsoid. In many embodiments the substantially ellipsoidal packing element 1 will be capable of at least partially rotating, preferably rolling, on an inclined plane it at least one, preferably two or more, more preferably three or more orientations. One skilled in the art will understand that as the shape of the packing element 1 approaches that of a perfect ellipsoid it will be able to roll better and ultimately then roll in many orientations. For less rotationally-symmetrical substantially-ellipsoidal elements 1, the rolling may also comprise other motions such as wobbling, spinning, sliding, or hopping as part of the overall movement down an inclined plane 900.

Similar to the substantially spherical embodiment seen earlier in FIG. 1-4, the substantial ellipsoidal packing element 1 of FIG. 7-10 has an outer surface 2 comprising three or more outer arched rib elements 21 and two outer connecting edge elements 22. It can be seen that this embodiment in fact has two outer connecting edge elements 22 and eight outer arched rib elements 21, and it does not have an optional inner surface 3 or optional inner arched rib elements 31.

The substantially ellipsoidal packing element 1 of FIG. 7-10 has the two outer connecting edge elements 22 and the outer arched rib elements 21 embodied such that the total projected area 4 of the packing element 1 when viewed in any direction, preferably a radial direction 5 or optional axial direction 6, is partially open due to the presence of an open projected area 41. In this specific embodiment it is open to an extent that ranges from about 20 to about 30% of the total area 4, and the average was about 25%. Therefore the difference between the maximum and minimum percent of open projected area 41 is less than about 10% in this embodiment.

Figure 9:
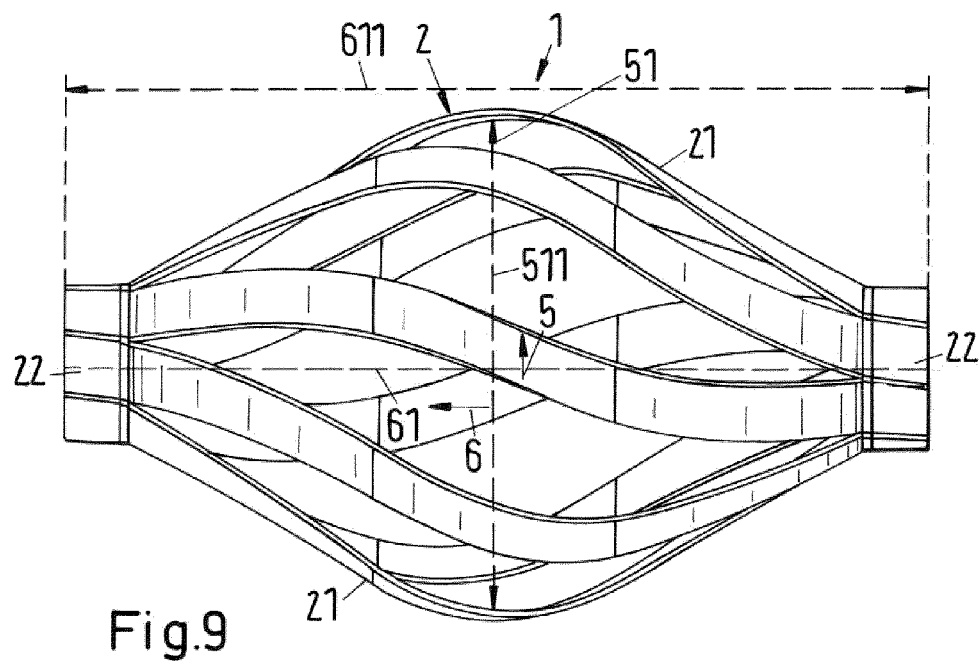
FIG. 9 shows yet another perspective of the substantially ellipsoidal packing element of FIG. 7.
Figure 10:
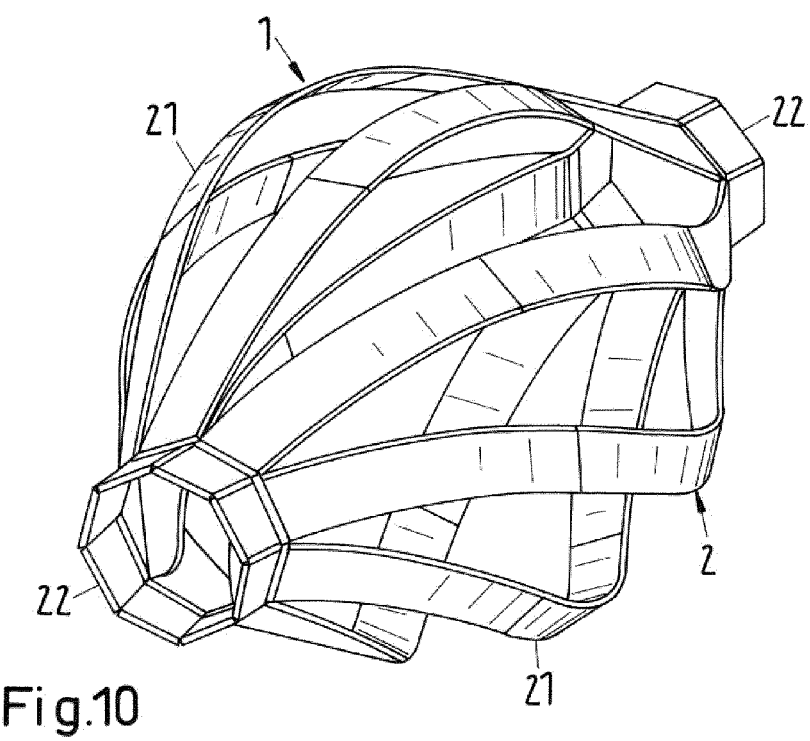
FIG. 10 shows still yet another perspective of the substantially ellipsoidal packing element of FIG. 7.

It can be seen in FIG. 9 that the substantially ellipsoidal packing element 1 has both a radial axis 51 having a direction 5 and a maximum radial length 511, as well as an axial axis 61 and direction 6 and axial length 611. It can also be seen from FIG. 9 that the packing element 1 is substantially longer in an axial direction 6 than in a radial direction 5 such that the ratio of the axial length 611 to the maximum radial length 511 is from about 1.1 to about 3, preferably from about 1.2 to about 2.5, more preferably from about 1.5 to about 2.2, most preferably from about 1.7 to about 2.0. In the specific embodiment shown in FIG. 9, the ratio is approximately 1.7. Such ratios help to ensure that the packing element 1 lands with its axial axis 61 oriented within the plane perpendicular to the direction of falling—but with the axial axis 61 randomly oriented within said plane—when it is poured or dumped to make a packed bed.

In a preferred embodiment of the method to produce the packing element 1, a substantially ellipsoidal packing element 1, such as the embodiments shown in FIG. 7-14, is produced from a sheet metal tube having two outer connecting edge elements 22 in the form of solid tube edge elements with rib elements in the form of connecting strips comprised by the interior tube portion between the edge elements 22 in a process in which the rib elements are bent outwards from the original tubular shape to produce outer arched rib elements 21 and an outer surface 2, and whereby the outer arched rib elements 21 are preferably twisted to misalign them from the axial axis 61 of the ellipsoidal packing element 1. In an alternative preferred embodiment, the cuts to make the rib elements 21 will have been made non-parallel to the axial axis 61 of the produced element 1 in order to minimize entanglements of the elements 1. Such manufacturing methods are economical in that they make use of inexpensive and simple materials and manufacturing steps.

Figure 13:
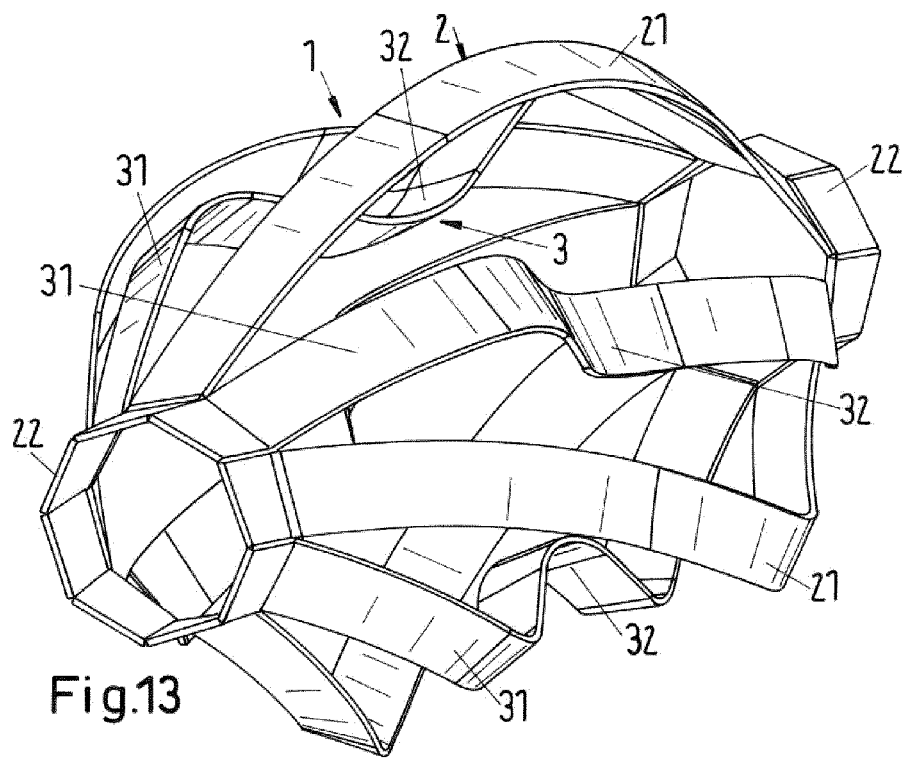
FIG. 13 shows a schematic view of an embodiment of a substantially ellipsoidal packing element according to the invention having inner arched rib elements partially inner arched in one or more continuous inner arched segments.
Figure 14:
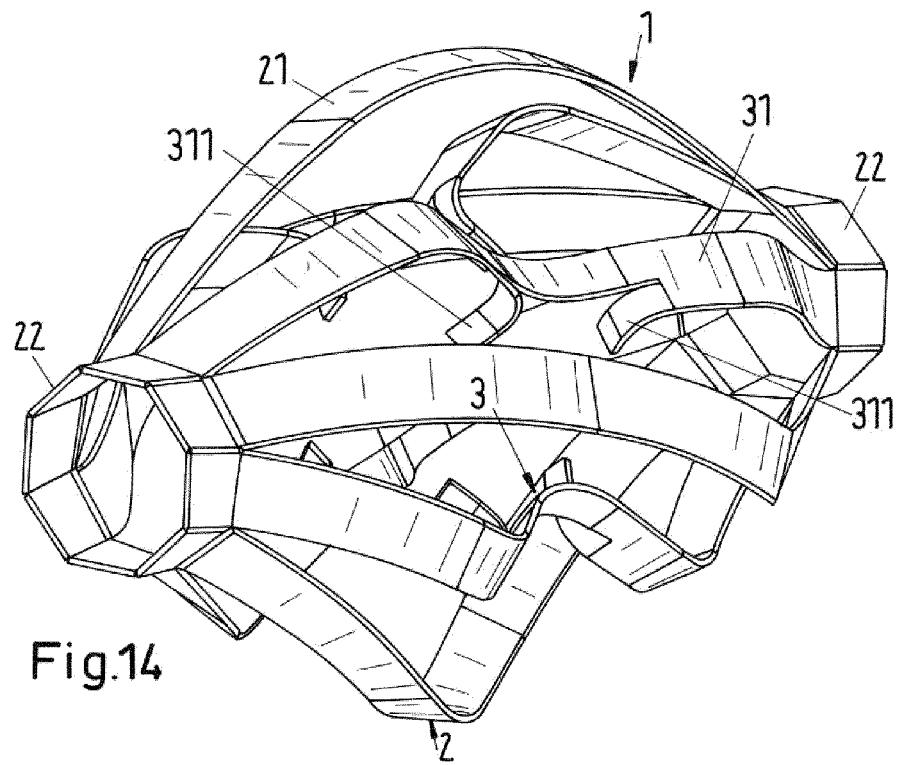
FIG. 14 shows a schematic view of an embodiment of a substantially ellipsoidal packing element according to the invention having inner arched rib elements partially inner arched and partially discontinuous in one or more discontinuous inner arched segments.

FIG. 11-14 show some preferred embodiments of substantially ellipsoidal packing elements 1 of the invention. The embodiment shown in FIG. 11 has outer arched rib element segments 211 that are partially discontinuous; whereas the embodiment in FIG. 12 has outer arched rib element segments 211 that are fully discontinuous. FIG. 13 shows a preferred embodiment having inner arched rib elements 31 wherein each element 31 is partially inner arched in one continuous inner arched segment 32. FIG. 14 shows another preferred embodiment having inner arched rib elements 31 wherein each element 31 is partially inner arched and partially discontinuous to provide discontinuous inner arched rib element segments 311. As discussed earlier such segments as 211, 32, or 311 beneficially increase the number of contact points between gas and liquid along the flow axis in the packed bed. In preferred embodiments, the segment 211 and/or 311 is advantageously directed towards the interior of the packing element 1 so as to minimize protruding elements from the outer surface of the packing element and resulting entanglements or interference with rotation and/or rolling.

In a preferred embodiment of the packing element, the total number of outer arched rib elements and any inner arched rib elements is from 3 to 20, preferably 4 to 15, more preferably 4 to 10, most preferably 5 to 8. Such total numbers of rib elements provide an optimum strength and mechanical integrity of the packing element and resist its deformation, along with providing a high surface area, while being easily and inexpensively manufactured and providing sufficient and homogeneous open projected area for achieving a low pressure drop, high fluid flow, and good liquid distribution.

In some other preferred embodiments of substantially ellipsoidal packing elements 1 of the invention, the outer arched rib elements 21 and optional inner arched rib elements 31 may be centrally longitudinally aligned along the axial axis, or, preferably, may be alternatingly misaligned from a central longitudinal axial axis. This misalignment creates points of vapor/liquid contact rather than the plane of fluid contact created by centrally aligned rib elements. In addition, the misalignment serves to open the longitudinal fluid flow path through the body of the packing element 1 by minimizing the shielding effect that results from consecutive, centrally aligned rib elements. Further, the longitudinal misalignment can reduce the tendency of one or more rib elements of one random packing element 1 to become interposed within one or more rib elements of other random packing elements 1, in a randomly packed bed, an occurrence sometimes referred to as "nesting." Nesting reduces mass transfer efficiency and can promote liquid and vapor channeling within the packed bed. In still other preferred embodiments, similar effects may be achieved by twisting the rib elements.

Another aspect of the present invention is a mass transfer column or a heat transfer column or a chemical reactor containing a packed bed comprising a plurality of packing elements 1. Such packed beds advantageously make use of the favorable low pressure drop and homogenous pressure drop fields and high flow properties of the packing element 1 of the invention. As a result such columns and reactors will have less problems with flooding and a poor distribution of the phases in their beds. In specific embodiments, the column or reactor may contain various combinations of beds, for example, including at least one bed of the invention but including also one or more random packed beds, structured packed beds, and/or tray sections.

Another related aspect of the present invention is a method to prepare the packed bed of such mass transfer columns, heat transfer columns or chemical reactors, wherein the process comprises randomly pouring or dumping the packing elements 1 of the invention into the column or reactor in order to produce a packed bed comprising a plurality of packing elements 1 in a variety of random orientations.

In some embodiments, the surface of the packed bed comprising a plurality of packing elements 1 will typically be between about 20 $m^2/m^3$ and about 500 $m^2/m^3$. In other embodiments, the free volume of the packed bed will be between about 92 and about 98%. In other embodiments, the packed bed will have a mass of between about 100 and about 400 $kg/m^3$.

Yet another aspect of the present invention is the use of the packing element 1 of the invention as a random packing element or one of the columns or the reactor containing a packed bed comprising a plurality of packing elements (1) in a mass transfer and/or heat transfer process and/or in a chemical reaction.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

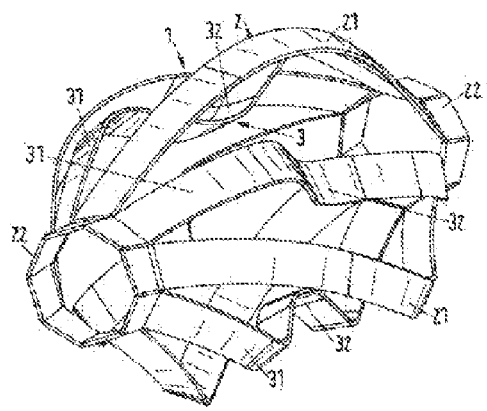

The invention claimed is:

1. A packing element (1) for use in mass and/or heat transfer processes through which at least one liquid may flow, wherein the packing element (1):
    has an outer surface (2) comprising three or more outer arched rib elements (21) and two outer connecting edge elements (22),
    has an inner surface (3) comprising inner arched rib elements (31),
    wherein the element (1) is substantially spherical or substantially ellipsoidal, and wherein the outer connecting edge elements (22) and the outer arched rib elements (21) and inner arched rib elements (31) are embodied such that the total projected area (4) of the packing element (1) when viewed in any direction (7) is partially open due to the presence of an open projected area (41), wherein it is open to an extent that ranges from 15 to 50% of the total projected area (4),
    wherein the packing element (1) comprises at least one inner arched rib element (31) being partially inner arched in one or more continuous inner arched segments (32).

2. The packing element (1) of claim 1, wherein the difference between the maximum and minimum percent of open projected area (41) is less than 20%.

3. The packing element (1) of claim 1, wherein the packing element (1) is capable of rolling on an inclined plane (900) in at least one orientation.

4. The packing element (1) of claim 1, wherein the packing element (1) is ellipsoidal in shape and longer in an axial direction (6) than in a radial direction (5) such that the ratio of the axial length (611) to the maximum radial length (511) is from 1.1 to 3.

5. The packing element (1) of claim 4, wherein the packing element (1) is capable of rolling on an inclined plane (900) in at least two or more orientations.

6. The packing element (1) of claim 1, wherein the total number of outer arched rib elements (21) and any inner arched rib elements (31) is from 3 to 20.

7. The packing element (1) of claim 1, wherein the packing element (1) is made of metal made of thickness 3.0 to 0.08 mm, or of ceramic or of a plastic material.

8. A mass transfer column or a heat transfer column or a chemical reactor containing a packed bed comprising a plurality of packing elements (1) of claim 1.

9. The method to prepare the packed bed of the mass transfer column or the heat transfer column or the chemical reactor of claim 8, wherein the process comprises randomly pouring or dumping the packing elements (1) of claim 1 into the column or reactor in order to produce a packed bed comprising a plurality of packing elements (1) in a variety of random orientations.

10. Use of the packing element (1) of claim 1 as a random packing element or one of the columns or the reactor of claim 8 in a mass transfer and/or heat transfer process and/or in a chemical reaction.

11. The packing element (1) of claim 3 wherein the packing element (1) is capable of rolling on an inclined plane (900) in at least two or more orientations.

12. The packing element (1) of claim 1, wherein the total projected area (4) of the packing element (1) when viewed in any direction (7) is partially open due to the presence of an open projected area (41), wherein it is open to an extent that ranges from 18 to 35% of the total projected area (4).

13. The packing element (1) of claim 1, wherein the total projected area (4) of the packing element (1) when viewed in any direction (7) is partially open due to the presence of an open projected area (41), wherein it is open to an extent that ranges from 20 to 30% of the total projected area (4).

14. The packing element (1) of claim 1, wherein i) the inner arched rib element (31) is partially or fully discontinuous to provide a discontinuous inner arched rib element segment (311); ii) at least one of the outer arched rib elements (21) is partially or fully discontinuous to provide an outer arched rib element segment (211); or iii) a combination of (i) and (ii).

15. The packing element (1) of claim 1, wherein when viewed in any and all directions is partially open due to the presence of an open projected area, wherein when viewed in any and all directions is open to an extent that ranges from 15 to 50% of the total projected area (4).

* * * * *

UNITED STATES PATENT AND TRADEMARK OFFICE
CERTIFICATE OF CORRECTION

PATENT NO. : 9,452,412 B2
APPLICATION NO. : 14/388364
DATED : September 27, 2016
INVENTOR(S) : Ilja Ausner et al.

It is certified that error appears in the above-identified patent and that said Letters Patent is hereby corrected as shown below:

On the Title Page

Delete the title page and substitute therefore with the attached title page

In the Claims

Column 18 add; claim 16 -- A method to produce the packing element (1) of claim 1 in which the packing element (1) is formed from a metal sheet in a forming process by the forming steps consisting of cutting, bending and twisting, optionally perforating or punching, preferably only cutting and bending, and wherein preferably on average less than 20, more preferably less than 10, and most preferably less than 1 weight % of the metal sheet per weight of the packing element (1) is discarded or lost as waste from the forming process. --

Column 18 add; claim 17 -- A method to produce the packing element (1) according to claim 10, wherein the packing element (1) is either:

(i) substantially spherical and wherein the element (1) is produced from a flat metal sheet having two outer connecting edge elements (22) in the form of parallel opposing rectangular flaps and rib elements in the form of curved strips between the edge elements (22) in a process comprising a step in which some rib elements are bent up and other rib elements are bent down from the edge elements (22) and the plane of the metal sheet in order to produce outer arched rib elements (21) and an outer surface (2), and a subsequent step in which two directly opposing corners of the edge elements (22) are drawn towards each other or (ii) substantially ellipsoidal and wherein the element (1) is produced from a sheet metal tube having two outer connecting edge elements (22) in the form of solid tube edge elements with rib elements in the form of connecting strips comprised by the interior tube portion between the edge elements (22) in Signed and Sealed this
Twenty-seventh Day of December, 2016

Michelle K. Lee
*Director of the United States Patent and Trademark Office* a process in which the rib elements are bent outwards from the original tubular shape to produce outer arched rib elements (21) and an outer surface (2), and whereby the outer arched rib elements (21) are preferably twisted or cut to misalign them from the axial axis (61) of the ellipsoidal packing element (1). --

Column 18 add; claim 18 -- A method to produce the packing element (1) of claim 1 in which the packing element (1) is made of a thermoplastic material, optionally a thermoplastic material filled with a filler or fibers, in a forming process comprising an injection molding step. --

(12) United States Patent
Ausner et al.

(10) Patent No.: US 9,452,412 B2
(45) Date of Patent: Sep. 27, 2016

(54) PACKING ELEMENT, METHOD TO PRODUCE IT AND A COLUMN OR REACTOR COMPRISING SAID ELEMENT

(71) Applicant: Sulzer Chemtech AG, Winterthur (CH)

(72) Inventors: Ilja Ausner, Oehningen (DE); Florian Kehrer, Effretikon (CH)

(73) Assignee: Sulzer Chemtech AG, Winterthur (CH)

(*) Notice: Subject to any disclaimer, the term of this patent is extended or adjusted under 35 U.S.C. 154(b) by 17 days.

(21) Appl. No.: 14/388,364

(22) PCT Filed: Dec. 14, 2012

(86) PCT No.: PCT/EP2012/075477
§ 371 (c)(1),
(2) Date: Sep. 26, 2014

(87) PCT Pub. No.: WO2013/143629
PCT Pub. Date: Oct. 3, 2013

(65) Prior Publication Data
US 2015/0069663 A1 Mar. 12, 2015

(30) Foreign Application Priority Data
Mar. 27, 2012 (EP) .................... 12161428

(51) Int. Cl.
*B01F 3/04* (2006.01)
*B01J 19/30* (2006.01)
(Continued)

(52) U.S. Cl.
CPC .......... *B01J 19/30* (2013.01); *B01F 3/04468* (2013.01); *B01F 3/04496* (2013.01);
(Continued)

(58) Field of Classification Search
CPC ..... B01F 3/04; B01F 3/0446; B01F 3/04468; B01F 3/04496
USPC ........................ 261/94, 108, DIG. 72
See application file for complete search history.

(56) References Cited

U.S. PATENT DOCUMENTS 4,554,114 A 11/1985 Glen et al.
5,112,536 A * 5/1992 McNulty .............. B01J 19/30
  261/94
(Continued)

FOREIGN PATENT DOCUMENTS

CN 2083071 U 8/1991
CN 201889198 U 7/2011
(Continued)

*Primary Examiner* — Robert A Hopkins
(74) *Attorney, Agent, or Firm* — Larson & Anderson, LLC

(57) ABSTRACT

A packing element (1) for use in mass and/or heat transfer processes through which at least one liquid may flow, wherein the packing element (1) has an outer surface (2) comprising three or more outer arched rib elements (21) and two outer connecting edge elements (22), optionally has an inner surface (3) comprising optional inner arched rib elements (31), wherein the element 1 is substantially spherical or substantially ellipsoidal, and wherein the outer connecting edge elements (22) and the outer arched rib elements (21) and optional inner arched rib elements (31) are embodied such that the total projected area (4) of the packing element (1) when viewed in any direction (7), preferably a radial direction (5) or optional axial direction (6), is partially open due to the presence of an open projected area (41), wherein it is open to an extent that ranges from about 15 to about 50, preferably about 17 to about 40, more preferably about 18 to about 35, most preferably about 20 to about 30% of the total projected area (4). The invention further relates to a method for producing said element (1). The present invention further relates also to a column or reactor comprising a bed of said elements (1), a method to prepare said bed, and the use of the element (1) or column or reactor in a mass transfer and/or heat transfer process and/or in a chemical reaction.

18 Claims, 7 Drawing Sheets